US011689306B2

(12) United States Patent
Sahu et al.

(10) Patent No.: US 11,689,306 B2
(45) Date of Patent: Jun. 27, 2023

(54) TDM AND TDMA CONCURRENT MODE TRANSMISSION

(71) Applicant: Hughes Network Systems, LLC, Germantown, MD (US)

(72) Inventors: Suchita Sahu, Gaithersburg, MD (US); Bala Subramaniam, Potomac, MD (US); Paul LaCasse, New Market, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/481,456

(22) Filed: Sep. 22, 2021

(65) Prior Publication Data

US 2022/0376809 A1     Nov. 24, 2022

Related U.S. Application Data

(60) Provisional application No. 63/190,594, filed on May 19, 2021.

(51) Int. Cl.
*H04B 7/185*     (2006.01)
*H04J 3/16*     (2006.01)

(52) U.S. Cl.
CPC ........ *H04J 3/1694* (2013.01); *H04B 7/18513* (2013.01)

(58) Field of Classification Search
CPC ............................ H04J 3/1694; H04B 7/18513
See application file for complete search history.

(56) References Cited

U.S. PATENT DOCUMENTS

| 2006/0189275 A1* | 8/2006 | Karabinis | H04B 7/18591 |
| | | | 455/12.1 |
| 2012/0275468 A1* | 11/2012 | Leprovost | H04N 21/2662 |
| | | | 370/442 |
| 2018/0241460 A1* | 8/2018 | Hong | H04H 40/90 |
| 2021/0028904 A1* | 1/2021 | Michael | H04Q 11/04 |

OTHER PUBLICATIONS

International Search Report and Written Opinion for PCT/US2022/025259 dated Jul. 20, 2022 (13 pages).

(Continued)

*Primary Examiner* — Fred A Casca
(74) *Attorney, Agent, or Firm* — Bejin Bieneman PLC

(57) ABSTRACT

A system comprises a computer having a processor and a memory, the memory storing instructions executable by the processor to identify data to be communicated to a satellite gateway via a satellite, the data including first data and second data, determine to communicate the data to the satellite gateway in a time-division multiplexing (TDM) and time-division multiple access (TDMA) (TDM/TDMA) concurrent transmission mode, and responsive to the determination to communicate the data to the satellite gateway in the TDM/TDMA concurrent transmission mode, transmit the first data to the satellite according to a TDM channel access scheme and transmit the second data to the satellite according to a TDMA channel access scheme that differs from the TDM channel access scheme.

20 Claims, 11 Drawing Sheets

(56) References Cited

OTHER PUBLICATIONS

Satlink: "TDMA vs. SCPC SatLink System Technical Notes", Jan. 1, 2014 (Jan. 1, 2014), pp. 1-12, XP055941461, Irvine, CA, US; Retrieved from the Internet: URL:https://www.academia.edu/28354738/TDMA_vs._SCPC_SatLink_System_Technical_Notes [retrieved on Jul. 12, 2022] sections 1-8; figures 1-4; table 1.

Ananasso F et al: "Clock Synchronus Multicarrier Demodulator for Multi-Frequency TDMA Communications Satellites", International Conference on Communications. Including Supercomm Technical Sessions. Atlanta, Apr. 15-19, 1990; [International Conference on Communications], New York, IEEE, US, vol. 3 of 04, Apr. 15, 1990 (Apr. 15, 1990), pp. 1059-1063, XP000145992, section 1, 5; figures 1, 3, 4, 8, 9.

\* cited by examiner

TDM AND TDMA CONCURRENT MODE TRANSMISSION

BACKGROUND

In satellite communication networks, return channels convey data communications from satellite terminals to satellite gateways. Appropriate timings, formats, durations, and other characteristics for transmissions over any particular return channel are specified by an applicable channel access scheme.

DETAILED DESCRIPTION

Figure 1:
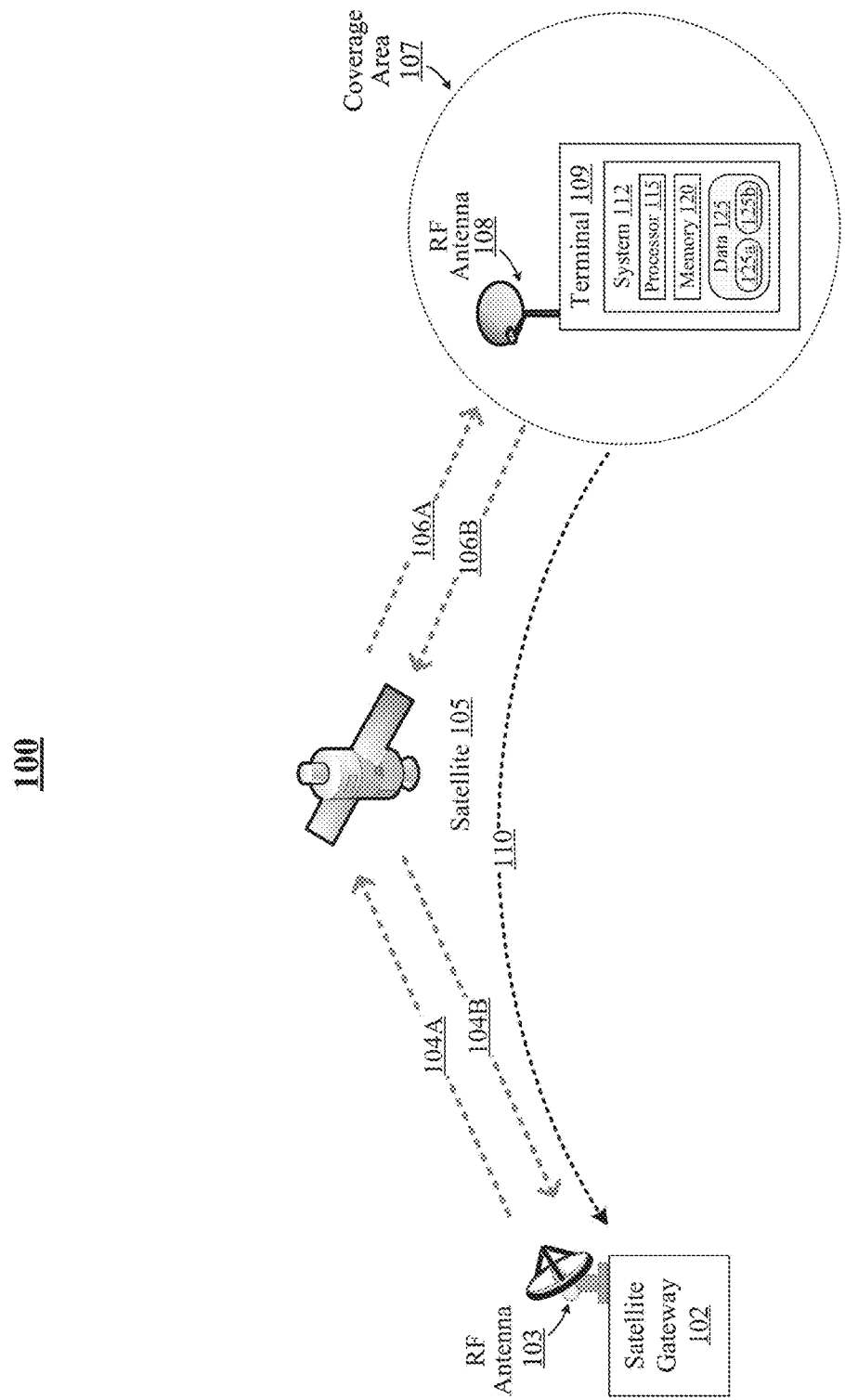
FIG. 1 illustrates an example of a satellite network.

Disclosed herein is a system for communicating data from a satellite terminal to a satellite gateway, via a satellite, in a time-division multiplexing (TDM) and time-division multiple access (TDMA) (TDM/TDMA) concurrent transmission mode. In the TDM/TDMA concurrent transmission mode, the satellite terminal transmits first data to the satellite according to a TDM channel access scheme (e.g., in TDM superframes), and transmits second data to the satellite according to a TDMA channel access scheme (e.g., in TDMA bursts). Using the flexibility associated with being able to concurrently use TDM transmissions and TDMA transmissions to convey data to the satellite gateway, the satellite terminal can accommodate heightened levels of data traffic, while utilizing wireless spectrum in an efficient manner.

A system can comprise a computer having a processor and a memory, the memory storing instructions executable by the processor to identify data to be communicated to a satellite gateway via a satellite, the data including first data and second data, determine to communicate the data to the satellite gateway in a time-division multiplexing (TDM) and time-division multiple access (TDMA) (TDM/TDMA) concurrent transmission mode, and responsive to the determination to communicate the data to the satellite gateway in the TDM/TDMA concurrent transmission mode, transmit the first data to the satellite according to a TDM channel access scheme and transmit the second data to the satellite according to a TDMA channel access scheme that differs from the TDM channel access scheme.

The memory can store instructions executable by the processor to transmit the first data to the satellite via a first wireless channel according to the TDM channel access scheme and transmit the second data to the satellite via a second wireless channel according to the TDMA channel access scheme.

The memory can store instructions executable by the processor to transmit the first data to the satellite via a wireless channel according to the TDM channel access scheme and transmit the second data to the satellite via the wireless channel according to the TDMA channel access scheme.

The transmitting the first data to the satellite according to the TDM channel access scheme can include transmitting one or more TDM physical layer frames.

The transmitting the first data to the satellite according to the TDM channel access scheme can include transmitting one or more TDM superframes.

The memory can store instructions executable by the processor to transmit the one or more TDM superframes via one or more continuous-mode TDM superframe transmissions.

The memory can store instructions executable by the processor to transmit the one or more TDM superframes via one or more bursty-mode TDM superframe transmissions.

The one or more TDM superframes can include a TDM superframe of a duration longer than a TDMA frame duration according to the TDMA channel access scheme.

The transmitting the second data to the satellite according to the TDMA channel access scheme can include transmitting one or more TDMA bursts.

The TDM channel access scheme and the TDMA channel access scheme can use TDMA frame timings as a common timing reference.

A method can comprise identifying data to be communicated to a satellite gateway via a satellite, the data including first data and second data, determining to communicate the data to the satellite gateway in a time-division multiplexing (TDM) and time-division multiple access (TDMA) (TDM/TDMA) concurrent transmission mode, and responsive to the determination to communicate the data to the satellite gateway in the TDM/TDMA concurrent transmission mode, transmitting the first data to the satellite according to a TDM channel access scheme and transmitting the second data to the satellite according to a TDMA channel access scheme that differs from the TDM channel access scheme.

The method can comprise transmitting the first data to the satellite via a first wireless channel according to the TDM channel access scheme and transmitting the second data to the satellite via a second wireless channel according to the TDMA channel access scheme.

The method can comprise transmitting the first data to the satellite via a wireless channel according to the TDM channel access scheme and transmitting the second data to the satellite via the wireless channel according to the TDMA channel access scheme.

The transmitting the first data to the satellite according to the TDM channel access scheme can include transmitting one or more TDM physical layer frames.

The transmitting the first data to the satellite according to the TDM channel access scheme can include transmitting one or more TDM superframes.

The method can comprise transmitting the one or more TDM superframes via one or more continuous-mode TDM superframe transmissions.

The method can comprise transmitting the one or more TDM superframes via one or more bursty-mode TDM superframe transmissions.

The one or more TDM superframes can include a TDM superframe of a duration longer than a TDMA frame duration according to the TDMA channel access scheme.

The transmitting the second data to the satellite according to the TDM A channel access scheme can include transmitting one or more TDMA bursts.

The TDM channel access scheme and the TDMA channel access scheme can use TDMA frame timings as a common timing reference.

FIG. 1 illustrates an example of a satellite network 100. Satellite network 100 includes a satellite gateway 102, which (e.g., using a radio frequency (RF) antenna 103) can transmit uplink signals to a satellite 105 via an uplink 104A. Satellite 105 can receive the uplink signals via uplink 104A, and can re-transmit those signals (possibly after amplification and/or frequency shifting) as downlink signals to devices in a coverage area 107 of satellite 105, via a downlink 106A. A terminal 109 in coverage area 107 can (e.g., using an RF antenna 108) receive downlink signals from satellite 105 via downlink 106A.

Devices in coverage area 107 can transmit uplink signals to satellite 105 via an uplink 106B. Satellite 105 can receive the uplink signals via uplink 106B, and can re-transmit those signals (possibly after amplification and/or frequency shifting) as downlink signals to satellite gateway 102, via a downlink 104B. Resources of uplink 106B and downlink 104B can be allocated to support inroutes for use by devices in coverage area 107 to transmit data to satellite gateway 102. For instance, terminal 109 can use an inroute 110 to transmit data to satellite gateway 102.

As shown in FIG. 1, terminal 109 can include a system 112, which can include processor 115 and memory 120. Memory 120 includes one or more forms of computer-readable media, and stores instructions executable by the processor for performing various operations, including as disclosed herein. Processor 115 can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). Processor 115 also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, system 112 can include multiple processors (including processor 115), each one of which can be implemented according to any of the examples above.

A plurality of inroutes can be defined/established for use by devices in coverage area 107 to transmit data to satellite gateway 102. The use of any particular one of such inroutes can involve transmission on uplink 106B via a different respective carrier frequency. A given device (e.g., terminal 109) in coverage area 107 may be able to transmit data to satellite gateway 102 via multiple inroutes. In order to do so, such a device can generate individual signals at the respective carrier frequencies of the multiple inroutes, combine those individual signals, and transmit the combined signal to satellite 105.

In some implementations, in conjunction with communicating over inroute 110, terminal 109 can perform data transmissions in accordance with a time-division multiplexing (TDM) channel access scheme. The TDM channel access scheme can support both continuous-mode and bursty-mode superframe transmissions. In some implementations, the TDM channel access scheme can be one defined by DVB-S2 satellite digital broadcasting standards and DVB-S2x extensions to those standards. In some implementations, terminal 109 can transmit data in DVB-S2x superframes consisting of 612,540 symbols.

In some implementations, in conjunction with communicating over inroute 110, terminal 109 can perform data transmissions in accordance with a time-division multiple access (TDM A) channel access scheme. The TDMA channel access scheme can support short duration bursts, which can be bracketed in time by ramp-up and ramp-down intervals. In some implementations, the TDMA channel access scheme can be one defined by Internet Protocol over Satellite (IPoS) standards. In some implementations, terminal 109 can transmit data in 4 slot, 8 Msps TDMA bursts. In other implementations, the sizes of TDMA bursts that terminal 109 transmits can be anywhere from 3 to 120 slots or more, and the TDMA bursts can be transmitted at symbol rates of anywhere from 128 ksps to 24 Msps or higher. In yet other implementations, the sizes of the TDM A bursts and/or the symbol rates of TDMA burst transmissions can fall outside these ranges.

In various implementations, terminal 109 can operate in a concurrent transmission mode. In the concurrent transmission mode, terminal 109 can concurrently transmit some data according to a TDMA channel access scheme and transmit other data according to a TDM channel access scheme, either via different respective inroutes/frequencies or via a same inroute/frequency.

Figure 2:
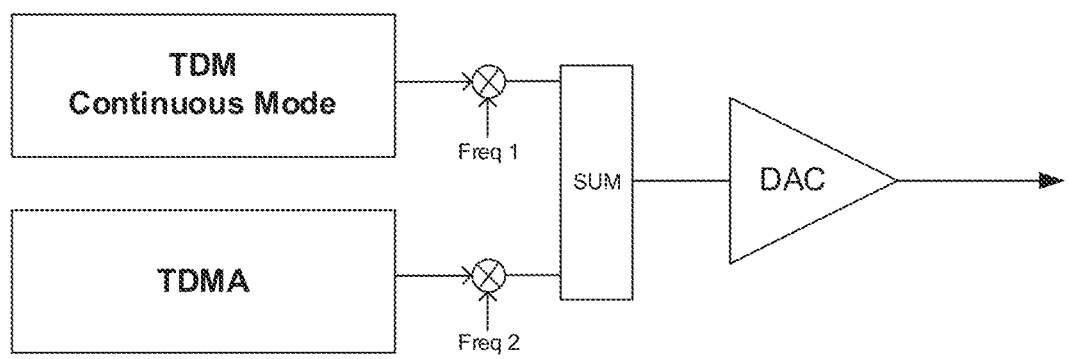
FIG. 2 illustrates an example of a first signal generation arrangement.

In some implementations, in the concurrent transmission mode, terminal 109 can concurrently transmit TDMA bursts on one frequency and continuous-mode TDM frames or superframes on another frequency. FIG. 2 illustrates an example of a signal generation arrangement 200 that may be representative of some such implementations. According to signal generation arrangement 200, TDM and TDMA operations are independent of each other. Continuous-mode TDM frames or superframes are conveyed by digital signals of a first frequency Freq 1, while TDMA bursts are conveyed by digital signals of a second frequency Freq 2. The digital signals are combined, and the combined digital signal is converted to analog for further processing and transmission.

Figure 3:
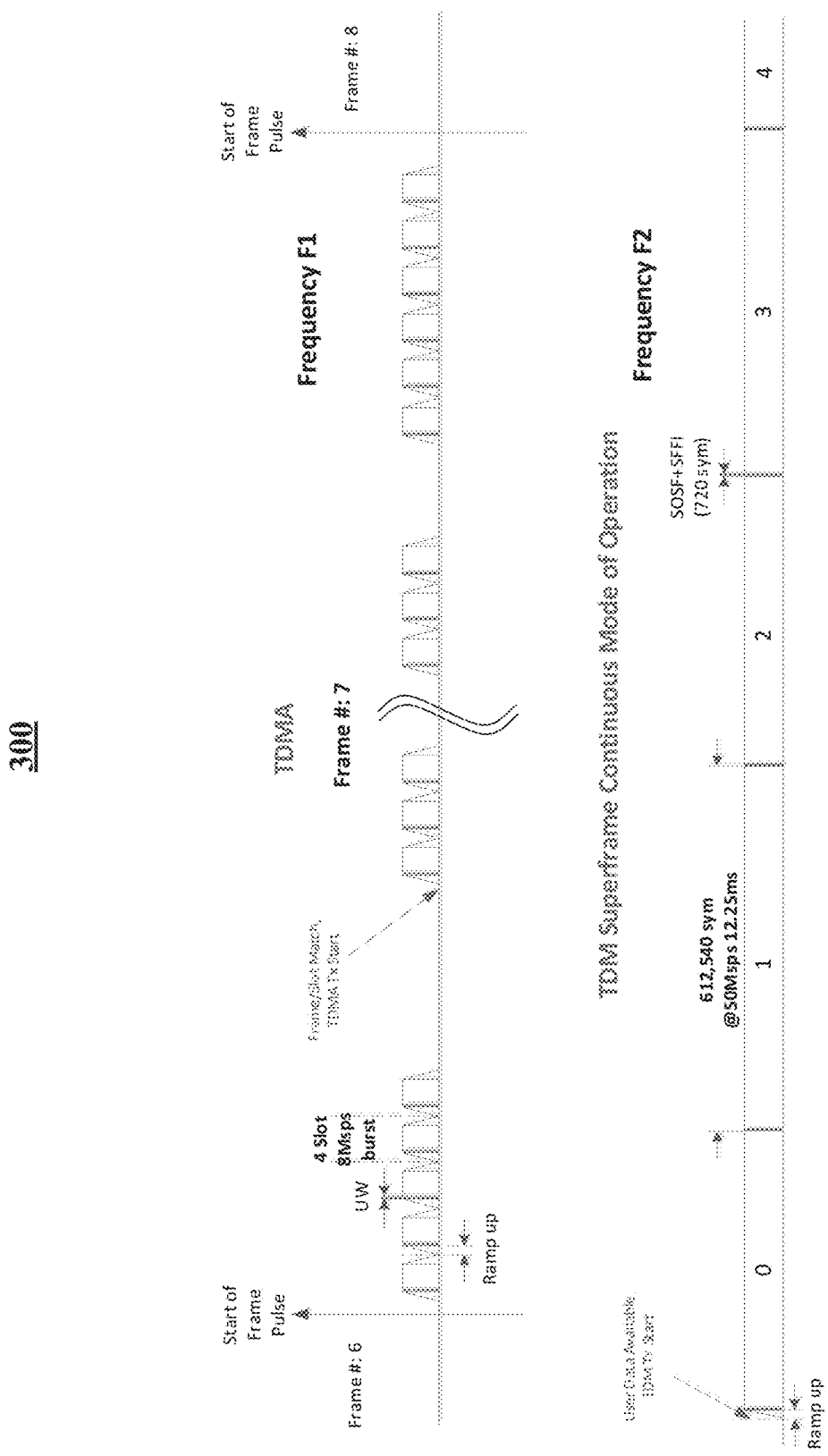
FIG. 3 illustrates an example of a first transmission scheme.

FIG. 3 illustrates an example of a transmission scheme 300 that may be representative of concurrent mode transmission of signals generated according to signal generation arrangement 200 in some implementations. According to transmission scheme 300, TDMA burst transmissions are performed on frequency F1 whenever they are scheduled, while continuous-mode TDM superframe transmissions are performed on frequency F2 whenever user data is available. In some implementations, the continuous-mode TDM transmissions can be continuous transmissions of physical layer frames rather than of superframes.

The continuous-mode TDM transmissions can start whenever data is available. The TDMA bursts, on the other hand, can be scheduled in advance to begin at particular TDMA slots. The start time of a given TDMA burst can be specified in the form of a frame number identifying a TDMA frame and a slot number identifying a slot within that TDMA frame. In FIG. 3, TDMA bursts are transmitted during various slots of a TDMA frame 7. The start of TDMA frame 7 is indicated by a start of frame pulse (which also indicates the end of a TDMA frame 6), and the end of TDMA frame 7 is indicated by a subsequent start of frame pulse (which also indicates the start of a TDMA frame 8). The transmitting device (e.g., terminal 109) features a timing unit that keeps track of TDMA frame timings, and includes a frame number counter and a slot number counter. When the current values of the frame number counter and the slot number counter match the scheduled frame number and slot number for a TDMA burst, transmission of that TDMA burst begins.

Transmission scheme 300 may reflect a scenario in which capacity of a TDMA inroute is used to supplement capacity of a dedicated TDM inroute. For instance, if a customer having a dedicated TDM inroute needs to accommodate extra user traffic during certain busy times (e.g., mornings and evenings), the customer could purchase coverage of a TDMA inroute on-demand to accommodate that extra user traffic. The TDMA inroute could be dedicated to that particular customer, or could be shared by multiple customers, in which case each customer could pay according to their utilization of the TDMA inroute.

Figure 4:
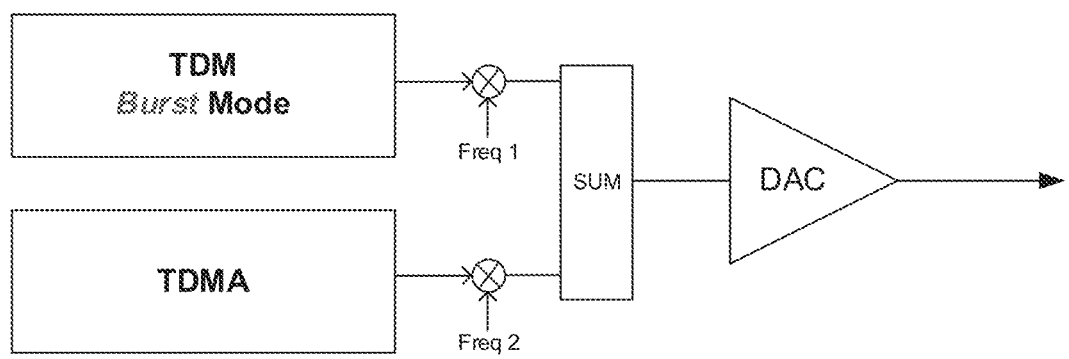
FIG. 4 illustrates an example of a second signal generation arrangement.

In some implementations, in the concurrent transmission mode, terminal 109 can concurrently transmit TDMA bursts on one frequency and bursty-mode TDM superframes on another frequency. FIG. 4 illustrates an example of a signal generation arrangement 400 that may be representative of some such implementations. According to signal generation arrangement 400, TDMA frame timings can be used as a common reference for both TDMA and TDM transmissions, which can be performed independently of each other. Bursty-mode TDM superframes are conveyed by digital signals of a first frequency Freq 1, while TDMA bursts are conveyed by digital signals of a second frequency Freq 2. The digital signals are combined, and the combined digital signal is converted to analog for further processing and transmission.

Figure 5:
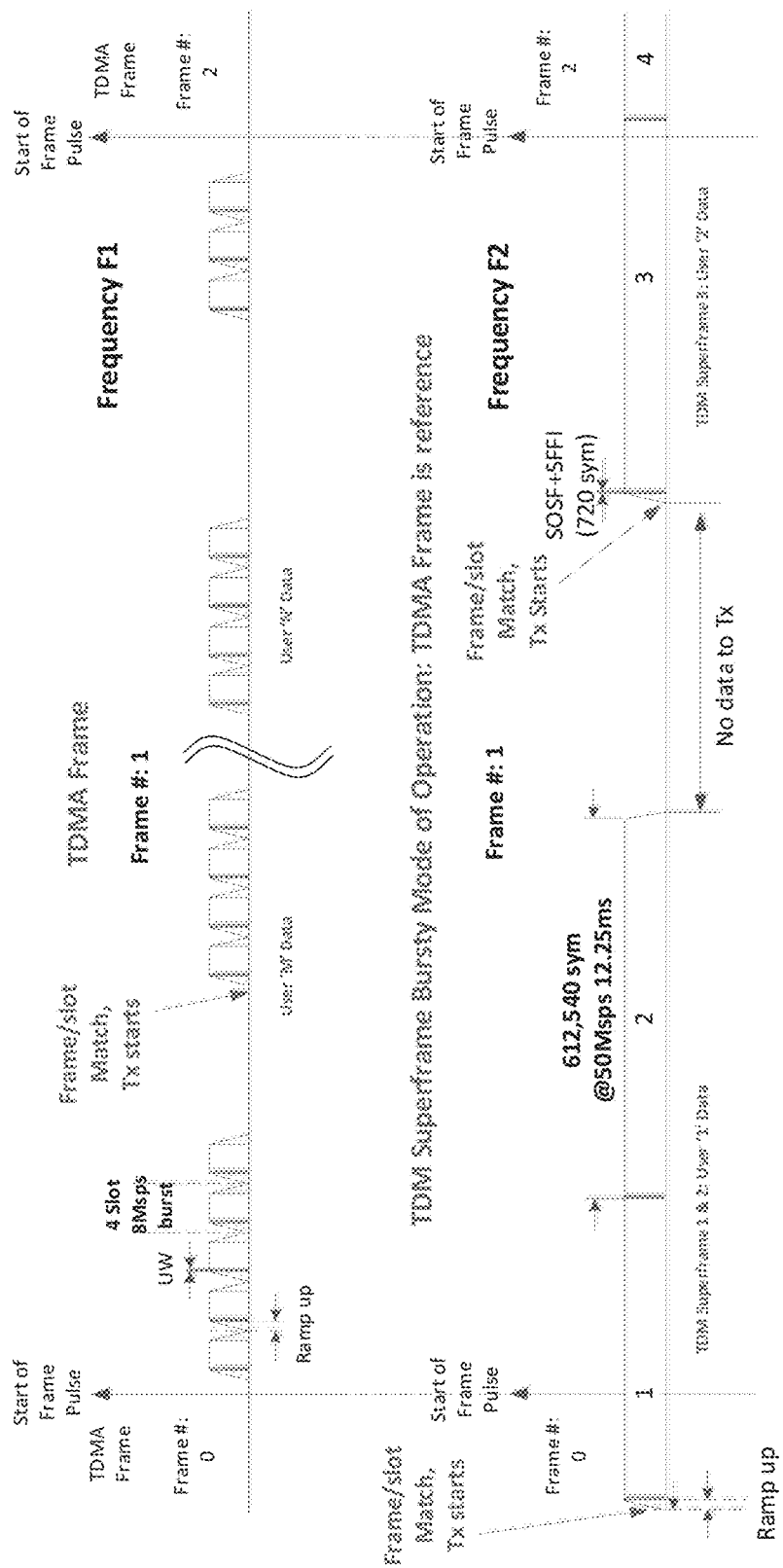
FIG. 5 illustrates an example of a second transmission scheme.

FIG. 5 illustrates an example of a transmission scheme 500 that may be representative of concurrent mode transmission of signals generated according to signal generation arrangement 400 in some implementations. According to transmission scheme 500, bursty-mode TDM superframe transmissions are scheduled for, and performed on, frequency F2, and TDMA burst transmissions are scheduled for, and performed on, frequency F1.

In some implementations, scheduling of both the TDMA burst transmissions and the bursty-mode TDM superframe transmissions can be conducted according to TDMA frame timings. In such implementations, the start time of any particular TDMA burst on frequency F1 or bursty-mode TDM superframe transmission on frequency F2 can be specified in the form of a frame number identifying a TDMA frame and a slot number identifying a slot within that TDMA frame.

In FIG. 5, TDMA bursts are transmitted during various slots of a TDMA frame 1, and include data of a user M and data of a user N. The start of TDMA frame 1 is indicated by a start of frame pulse (which also indicates the end of a TDMA frame 0), and the end of TDMA frame 1 is indicated by a subsequent start of frame pulse (which also indicates the start of a TDMA frame 2). Bursty-mode transmission of TDM superframes 1 and 2, containing data of a user 1, begins during TDMA frame 0 and extends into TDMA frame 1. Following an interval during which there is no data to transmit, bursty-mode transmission of TDM superframes 3 and 4, containing data of a user 2, begins during TDMA frame 1 and extends into TDMA frame 2.

Transmission scheme 500 may reflect a scenario in which capacity of a TDMA inroute is used to supplement capacity of a TDM inroute shared among multiple users. For instance, a customer served by a shared TDM inroute could use a shared TDMA inroute for transmission of user data at times during which the shared TDM inroute is in use by other customers.

Figure 6:
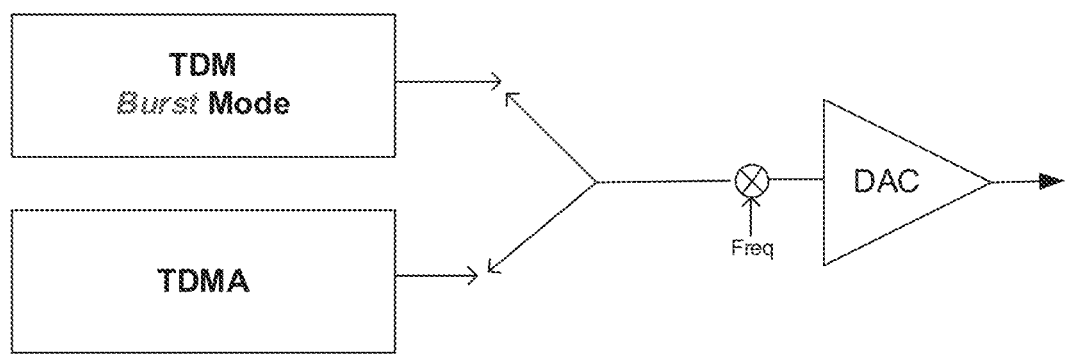
FIG. 6 illustrates an example of a third signal generation arrangement.

In some implementations, in the concurrent transmission mode, terminal 109 can concurrently transmit TDMA bursts and bursty-mode TDM superframes on a same frequency. FIG. 6 illustrates an example of a signal generation arrangement 600 that may be representative of some such implementations. According to signal generation arrangement 600, both bursty-mode TDM superframes and TDMA bursts are conveyed by a digital signal of a frequency Freq. The TDM superframes and TDMA bursts are scheduled such that they do not overlap with each other in time. Software and/or firmware of terminal 109 can coordinate the timings of the TDMA burst transmissions and bursty-mode TDM superframe transmissions on the same frequency. The digital signal is converted to analog for further processing and transmission.

Figure 7:
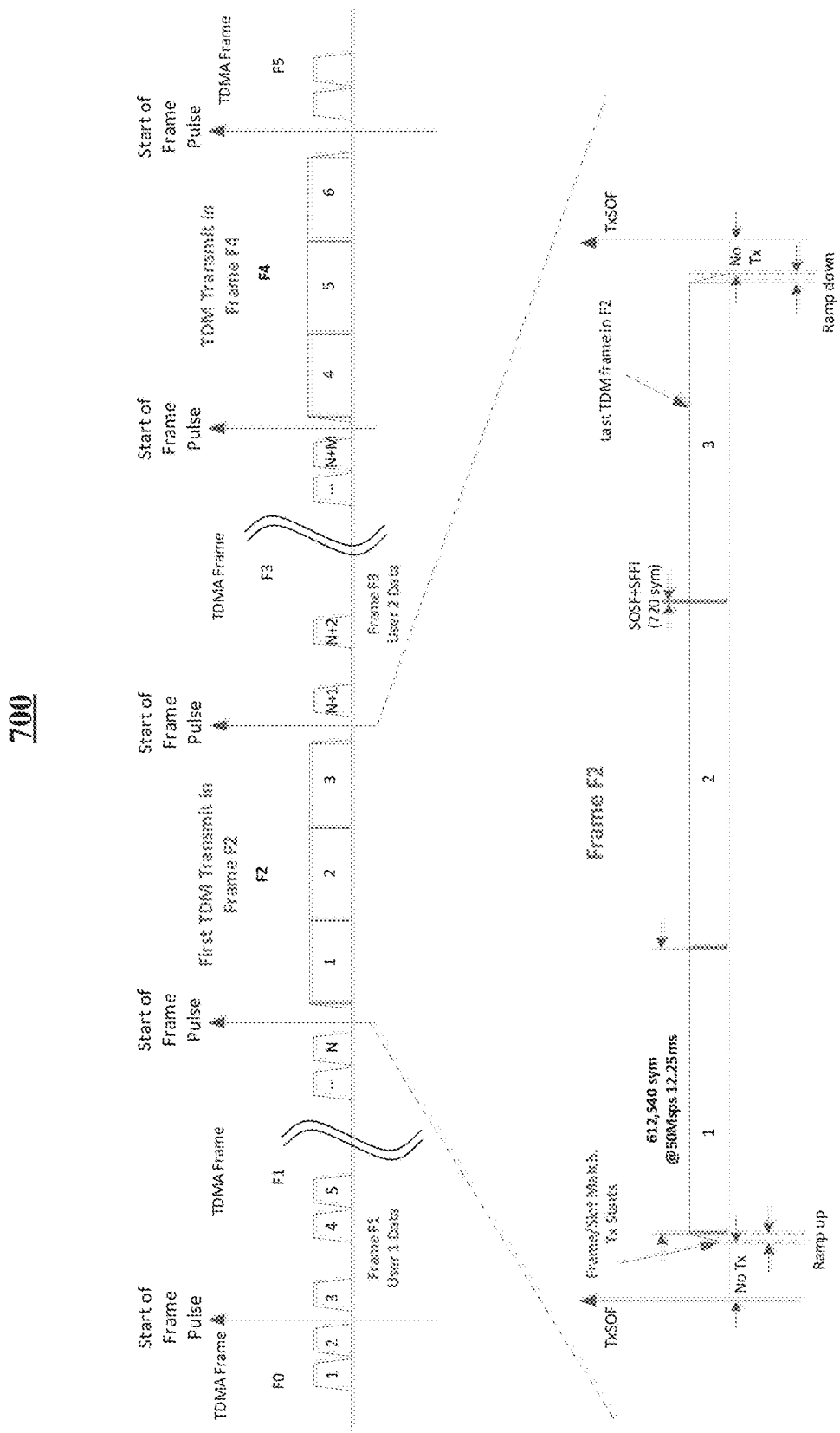
FIG. 7 illustrates an example of a third transmission scheme.

FIG. 7 illustrates an example of a transmission scheme 700 that may be representative of concurrent mode transmission of signals generated according to signal generation arrangement 600 in some implementations. According to transmission scheme 700, both bursty-mode TDM superframe transmissions and TDMA burst transmissions are scheduled for, and performed on, a same frequency, according to TDMA frame timings.

In FIG. 7, transmissions are scheduled during each of TDMA frames F1, F2, F3, and F4. TDMA bursts of a user 1 are scheduled during TDMA frame F1, and TDMA bursts of a user 2 are scheduled during TDMA frame F3. A bursty-mode transmission of three TDM superframes 1, 2, and 3 is scheduled during TDMA frame F2, while a bursty-mode transmission of three more TDM superframes 4, 5, and 6 is scheduled during TDMA frame F4.

Figure 8:
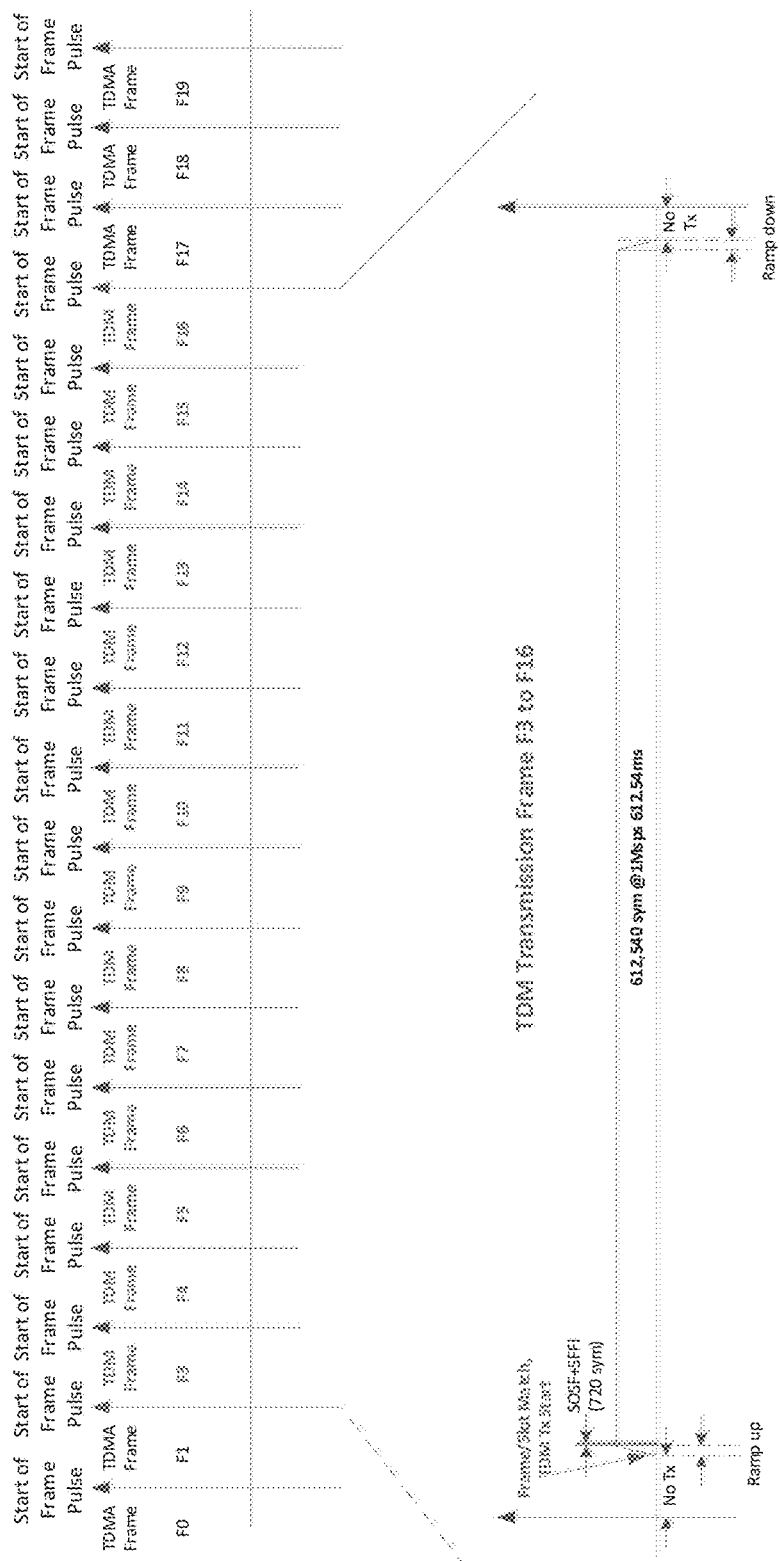
FIG. 8 illustrates an example of a fourth transmission scheme.

FIG. 8 illustrates an example of a transmission scheme 800 that may be representative of concurrent mode transmission of signals generated according to signal generation arrangement 600 in some implementations. According to transmission scheme 800, as according to transmission scheme 700, both bursty-mode TDM superframe transmissions and TDMA burst transmissions are scheduled for, and performed on, a same frequency, according to TDMA frame timings. However, according to transmission scheme 800, the transmission of a TDM superframe extends in time over multiple TDMA frames. Namely, a 612,540 symbol TDM superframe is transmitted at 1 Msps, such that it takes 612.54 ms to complete. As a result, transmission of the TDM superframe extends in time over fourteen TDMA frames F3-F16.

The symbol rate of transmission of TDM superframes in various implementations can be higher than the 1 Msps rate indicated in FIG. 8. In some implementations, TDM superframes can be transmitted at symbol rates of up to 400 Msps, or higher. Faster symbol rates can enable the completion of TDM superframe transmissions over lesser numbers of TDMA frames, and the use of given numbers of TDMA frames to accommodate greater numbers of TDM superframe transmissions.

Figure 9:
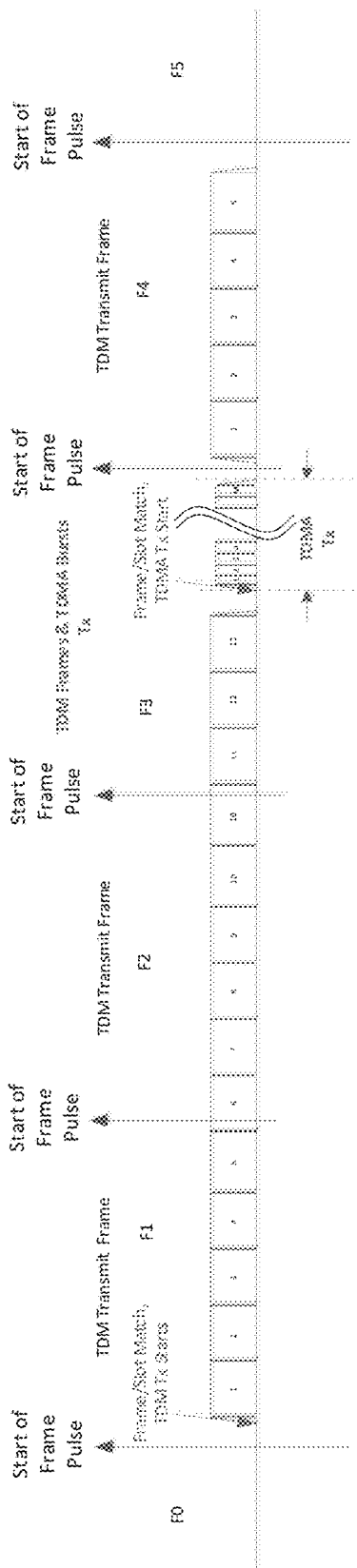
FIG. 9 illustrates an example of a fifth transmission scheme.

FIG. 9 illustrates an example of a transmission scheme 900 that may be representative of concurrent mode transmission of signals generated according to signal generation arrangement 600 in some implementations. According to transmission scheme 900, as according to transmission schemes 700 and 800, both bursty-mode TDM superframe transmissions and TDMA burst transmissions are scheduled for, and performed on, a same frequency, according to TDMA frame timings. However, according to transmission scheme 900, TDMA burst transmissions are scheduled within a time gap between bursty-mode TDM superframe transmissions.

In FIG. 9, a bursty-mode transmission of thirteen TDM superframes begins during a TDMA frame F1, and extends through a TDMA frame F2 into a TDMA frame F3. A subsequent bursty-mode transmission of five TDM superframes is initiated and completed during a TDMA frame F4. A time gap exists in TDMA frame F3 from the time at which the first bursty-mode TDM superframe transmission is completed until the end of TDMA frame F3. This time gap is utilized to schedule TDMA burst transmissions, such that capacity of the inroute is not wasted during the time gap.

Returning to FIG. 1, in some implementations, terminal 109 can (e.g., in conjunction with execution by processor 115 of instructions stored at memory 120) identify data 125 to be communicated to satellite gateway 102 via satellite 105, and determine to communicate data 125 to satellite gateway 102 in a TDM/TDMA concurrent transmission mode. Data 125 can include first data 125a and second data 125b. In some implementations, the determination to communicate data 125 to satellite gateway 102 in the TDM/TDMA concurrent transmission mode can be based on a determination that inroute 110 cannot accommodate transmission of all of data 125 (e.g., the amount of data 125 to be transmitted exceeds the available capacity of inroute 110). According to some implementations, inroute 110 may be a dedicated TDM inroute allocated for use by a customer associated with terminal 109, and data 125 may represent data to be transmitted to satellite gateway 102 during a time of heavy data traffic, such that there is too much data 125 to be transmitted for all of that data 125 to be conveyed via the dedicated TDM inroute. Under such circumstances, terminal 109 may determine to communicate data 125 to satellite gateway 102 in the TDM/TDMA concurrent transmission mode so that capacity of a TDMA inroute can be used to supplement that of the dedicated TDM inroute as needed to accommodate the amount of data 125 to be transmitted.

Responsive to the determination to communicate data 125 to satellite gateway 102 in the TDM/TDMA concurrent transmission mode, terminal 109 can transmit first data 125a to satellite 105 according to a TDM channel access scheme, and transmit second data 125b to satellite 105 according to a TDMA channel access scheme that differs from the TDM channel access scheme. According to some implementations, terminal 109 may transmit first data 125a over a first wireless channel (corresponding to a first inroute utilizing a first carrier frequency) according to the TDM channel access scheme, and may transmit second data 125b over a second wireless channel (corresponding to a second inroute utilizing a second carrier frequency) according to the TDMA channel access scheme. According to some implementations, terminal 109 may transmit the first data 125a and second data 125b over a same wireless channel (e.g., corresponding to inroute 110), according to the TDM channel access scheme and the TDMA channel access scheme, respectively.

In some implementations, transmission of first data 125a to satellite 105 according to the TDM channel access scheme can include transmission of one or more TDM physical layer frames. In some implementations, transmission of first data 125a to satellite 105 according to the TDM channel access scheme can include transmission of one or more TDM superframes. In some implementations, terminal 109 can perform transmission of the one or more TDM superframes in conjunction with one or more continuous-mode TDM superframe transmissions. In some implementations, terminal 109 can perform transmission of the one or more TDM superframes in conjunction with one or more bursty-mode TDM superframe transmissions. In some implementations, the one or more superframes can include a TDM superframe of a duration longer than a TDMA frame duration according to the TDMA channel access scheme.

In some implementations, transmission of second data 125b to satellite 105 according to the TDMA channel access scheme can include transmission of one or more TDMA bursts. In some implementations, the TDM channel access scheme and the TDMA channel access scheme using TDMA frame timings as a common timing reference.

In some implementations, in conjunction with communicating data 125 to satellite gateway 102 in the TDM/TDMA concurrent transmission mode, terminal 109 can generate (e.g., by a first transmit chain of terminal 109) a digital signal of a first frequency, and can generate (e.g., by a second transmit chain of terminal 109), a digital signal of a second frequency. The first frequency can be a carrier frequency of a first inroute to satellite gateway 102, and the digital signal of the first frequency can comprise one or more TDM superframes for transmission to satellite gateway 102 via the first inroute, according to the TDM channel access scheme. The second carrier frequency can be a carrier frequency of a second inroute to satellite gateway 102, and the digital signal of the second frequency can comprise one or more TDMA bursts for transmission to satellite gateway 102 via the second inroute, according to the TDMA channel access scheme. In some embodiments, terminal 109 can combine (e.g., by a digital signal combiner) the digital signal of the first frequency and the digital signal of the second frequency to obtain a combined digital signal, and can convert (e.g., by a digital-to-analog converter) the combined digital signal to an analog signal. In some embodiments, terminal 109 can generate an RF output signal by mixing (e.g., by an RF mixer) the analog signal with an RF carrier signal, and can transmit the RF output signal to satellite 105 (e.g., using RF antenna 108).

In some implementations, in conjunction with communicating data 125 to satellite gateway 102 in the TDM/TDMA concurrent transmission mode, terminal 109 can generate (e.g., by a transmit chain of terminal 109) a digital signal comprising one or more TDM superframes for transmission to satellite gateway 102 via an inroute (e.g., inroute 110) according to the TDM channel access scheme and one or more TDMA bursts for transmission to satellite gateway 102 via the inroute, according to the TDMA channel access scheme. In some embodiments, terminal 109 can convert (e.g., by a digital-to-analog converter) the digital signal to an analog signal, generate an RF output signal by mixing (e.g., by an RF mixer) the analog signal with an RF carrier signal, and transmit the RF output signal to satellite 105 (e.g., using RF antenna 108). In some such implementations, terminal 109 can transmit one or more TDMA bursts over the inroute during a time gap between two TDM superframe transmissions over the inroute.

Figure 10:
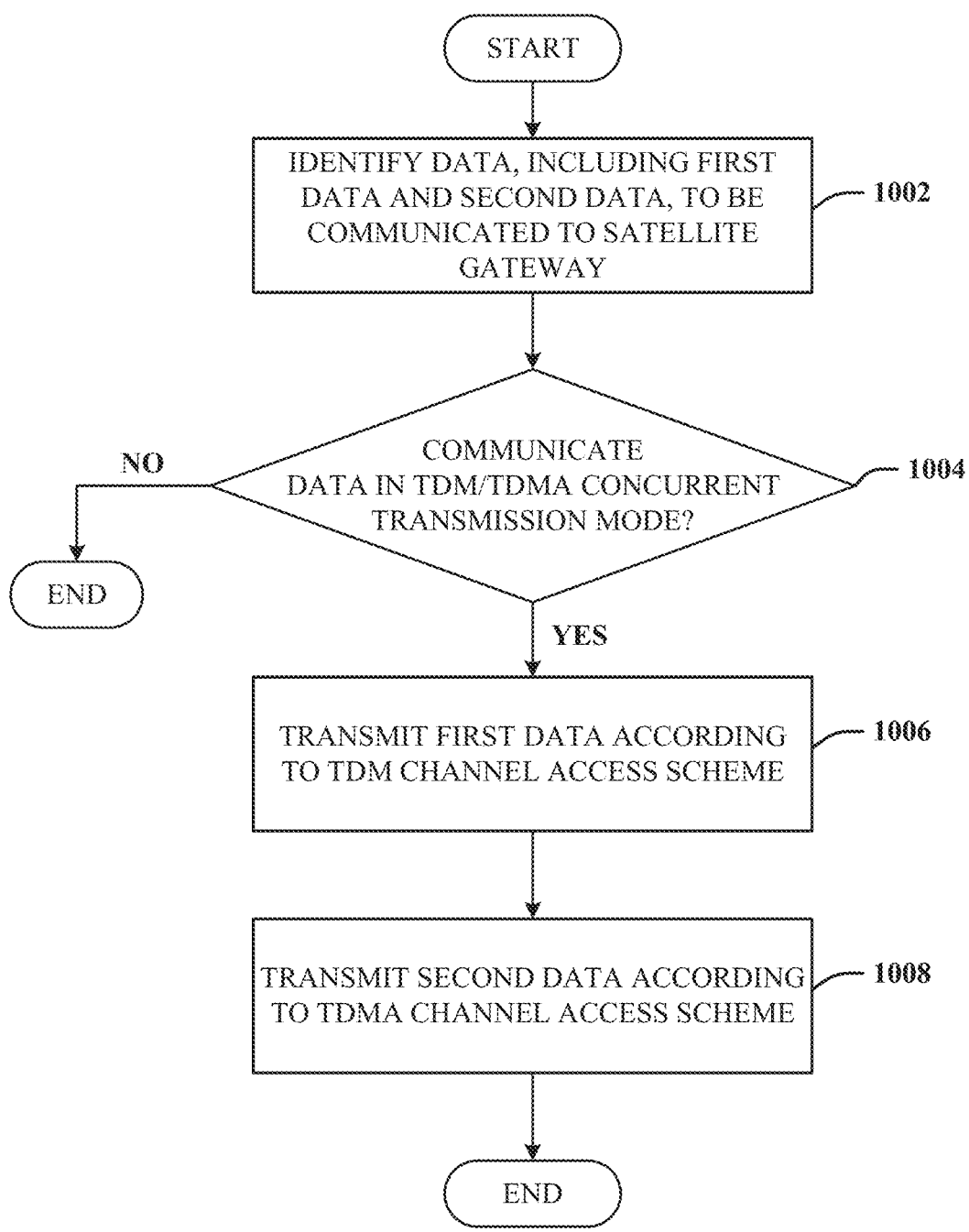
FIG. 10 is a block diagram of an example process flow.

FIG. 10 is a block diagram of an example process flow 1000 for transmitting data in a TDM/TDMA concurrent transmission mode according to some implementations. As shown in process flow 1000, data may be identified at 1002 that is to be communicated to a satellite gateway via a satellite. The data identified at 1002 can include first data and second data. For example, terminal 109 of FIG. 1 may identify data 125 that is to be communicated to satellite gateway 102 via satellite 105, and data 125 can include first data 125a and second data 125b. At 1004, it may be determined whether to communicate the data to the satellite gateway in a TDM/TDMA concurrent transmission mode. For example, terminal 109 of FIG. 1 may determine whether to communicate data 125 to satellite gateway 102 in a TDM/TDMA concurrent transmission mode. If a determination is made at 1004 that the data is not to be communicated to the satellite gateway in the TDM/TDMA concurrent transmission mode, the process flow may end.

Responsive to a determination at 1004 to communicate the data to the satellite gateway in the TDM/TDMA concurrent transmission mode, the first data may be transmitted at 1006 according to a TDM channel access scheme. For example, responsive to a determination to communicate data 125 to satellite gateway 102 in the TDM/TDMA concurrent transmission mode, terminal 109 of FIG. 1 may transmit first data 125a to satellite 105 according to a TDM channel access scheme. At 1008, the second data may be transmitted according to a TDMA channel access scheme that differs from the TDM channel access scheme according to which the first data is transmitted at 1006. For example, terminal 109 of FIG. 1 may transmit second data 125b to satellite 105 according to a TDMA channel access scheme that differs from a TDM channel access scheme according to which terminal 109 transmits first data 125a to satellite 105.

Figure 11:
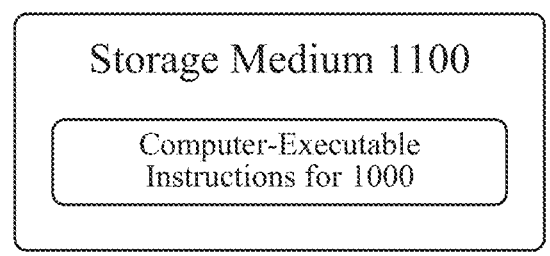
FIG. 11 is a block diagram of an example storage medium.

FIG. 11 is a block diagram of an example storage medium 1100. Storage medium 1100 may be any non-transitory computer-readable storage medium or machine-readable storage medium, such as an optical, magnetic or semiconductor storage medium. In various implementations, storage medium 1100 may be an article of manufacture. In some implementations, storage medium 1100 may store computer-executable instructions, such as computer-executable instructions to implement process flow 1000. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer-readable media associated therewith (e.g., disks, memories, etc.). A computer program product may comprise such instructions stored on computer-readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations, and should in no way be construed so as to limit the claims.

Accordingly, it is to be understood that the above description is intended to be illustrative and not restrictive. Many implementations and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future implementations. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A system, comprising:
   a processor; and
   a memory coupled to the processor, the memory storing instructions executable by the processor to:
   identify data to be communicated to a satellite gateway via a satellite, the data including first data and second data;
   determine to communicate the data to the satellite gateway in a time-division multiplexing (TDM) and time-division multiple access (TDMA) (TDM/TDMA) concurrent transmission mode; and
   responsive to the determination to communicate the data to the satellite gateway in the TDM/TDMA concurrent transmission mode:
   transmit the first data to the satellite according to a TDM channel access scheme; and
   concurrently transmit the second data to the satellite according to a TDMA channel access scheme that differs from the TDM channel access scheme.

2. The system of claim 1, the memory storing instructions executable by the processor to:
   transmit the first data to the satellite via a first wireless channel according to the TDM channel access scheme; and
   transmit the second data to the satellite via a second wireless channel according to the TDMA channel access scheme.

3. The system of claim 1, the memory storing instructions executable by the processor to:
   transmit the first data to the satellite via a wireless channel according to the TDM channel access scheme; and
   transmit the second data to the satellite via the wireless channel according to the TDMA channel access scheme.

4. The system of claim 1, the transmitting the first data to the satellite according to the TDM channel access scheme including transmitting one or more TDM physical layer frames.

5. The system of claim 1, the transmitting the first data to the satellite according to the TDM channel access scheme including transmitting one or more TDM superframes.

6. The system of claim 5, the memory storing instructions executable by the processor to transmit the one or more TDM superframes via one or more continuous-mode TDM superframe transmissions.

7. The system of claim 5, the memory storing instructions executable by the processor to transmit the one or more TDM superframes via one or more bursty-mode TDM superframe transmissions.

8. The system of claim 5, the one or more TDM superframes including a TDM superframe of a duration longer than a TDMA frame duration according to the TDMA channel access scheme.

9. The system of claim 1, the transmitting the second data to the satellite according to the TDMA channel access scheme including transmitting one or more TDMA bursts.

10. The system of claim 1, the TDM channel access scheme and the TDMA channel access scheme using TDMA frame timings as a common timing reference.

11. A method, comprising:
    identifying data to be communicated to a satellite gateway via a satellite, the data including first data and second data;
    determining to communicate the data to the satellite gateway in a time-division multiplexing (TDM) and time-division multiple access (TDMA) (TDM/TDMA) concurrent transmission mode; and
    responsive to the determination to communicate the data to the satellite gateway in the TDM/TDMA concurrent transmission mode:
    transmitting the first data to the satellite according to a TDM channel access scheme; and
    concurrently transmitting the second data to the satellite according to a TDMA channel access scheme that differs from the TDM channel access scheme.

12. The method of claim 11, comprising:

transmitting the first data to the satellite via a first wireless channel according to the TDM channel access scheme; and transmitting the second data to the satellite via a second wireless channel according to the TDMA channel access scheme.

13. The method of claim 11, comprising:

transmitting the first data to the satellite via a wireless channel according to the TDM channel access scheme; and transmitting the second data to the satellite via the wireless channel according to the TDMA channel access scheme.

14. The method of claim 11, the transmitting the first data to the satellite according to the TDM channel access scheme including transmitting one or more TDM physical layer frames.

15. The method of claim 11, the transmitting the first data to the satellite according to the TDM channel access scheme including transmitting one or more TDM superframes.

16. The method of claim 15, comprising transmitting the one or more TDM superframes via one or more continuous-mode TDM superframe transmissions.

17. The method of claim 15, comprising transmitting the one or more TDM superframes via one or more bursty-mode TDM superframe transmissions.

18. The method of claim 15, the one or more TDM superframes including a TDM superframe of a duration longer than a TDMA frame duration according to the TDMA channel access scheme.

19. The method of claim 11, the transmitting the second data to the satellite according to the TDMA channel access scheme including transmitting one or more TDMA bursts.

20. The method of claim 11, the TDM channel access scheme and the TDMA channel access scheme using TDMA frame timings as a common timing reference.

\* \* \* \* \*